United States Patent
Pyun et al.

(10) Patent No.: US 9,207,637 B2
(45) Date of Patent: Dec. 8, 2015

(54) APPARATUS FOR RECORDING AND REPRODUCING HOLOGRAM

(71) Applicant: SAMSUNG ELECTRONICS CO., LTD., Suwon-si (KR)

(72) Inventors: Kyoung-seok Pyun, Seoul (KR); Andrew Putilin, Moscow (RU); Alexander Morozov, Moscow (RU); Ivan Bovsunovskiy, Moscow (RU); Vladislav Druzhin, Moscow (RU); Sang-yoon Oh, Seoul (KR); Sang-yoon Lee, Seoul (KR); Chul-sung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 13/837,477

(22) Filed: Mar. 15, 2013

(65) Prior Publication Data

US 2014/0063578 A1    Mar. 6, 2014

(30) Foreign Application Priority Data

Sep. 5, 2012 (KR) .................. 10-2012-0098479

(51) Int. Cl.
G03H 1/00 (2006.01)
G03H 1/16 (2006.01)
G03H 1/04 (2006.01)
G03H 1/10 (2006.01)

(52) U.S. Cl.
CPC ............. *G03H 1/0476* (2013.01); *G03H 1/10* (2013.01); *G03H 1/16* (2013.01)

(58) Field of Classification Search
None
See application file for complete search history.

(56) References Cited

U.S. PATENT DOCUMENTS

| 6,330,088 B1 | 12/2001 | Klug et al. |
| 7,319,550 B2 | 1/2008 | Hayashi et al. |
| 7,969,849 B2 | 6/2011 | Suto et al. |
| 2006/0114792 A1* | 6/2006 | Uno et al. .................. 369/103 |

(Continued)

FOREIGN PATENT DOCUMENTS

| KR | 10-0624852 A | 9/2006 |
| KR | 10-2008-0112569 A | 12/2008 |

(Continued)

OTHER PUBLICATIONS

International Search Report (PCT/ISA/210) dated Jul. 11, 2013, issued in International Application No. PCT/KR2013/002374.

*Primary Examiner* — Jade R Chwasz
(74) *Attorney, Agent, or Firm* — Sughrue Mion, PLLC

(57) ABSTRACT

A hologram recording and reproducing apparatus including: a coherent light source; a beam splitter which splits a beam emitted from the coherent light source into a signal beam and a reference beam; a signal beam forming unit which modulates the signal beam split and directs the modulated signal beam onto a hologram recording medium; and a reference beam forming unit which directs the reference beam to be irradiated onto a location on the hologram recording medium which overlaps with a location on the hologram recording medium on which the signal beam is incident, wherein the signal beam forming unit includes: a first light guide member which transmits the signal beam split by the beam splitter; a spatial light modulator (SLM) which modulates the signal beam transmitted through the first light guide member; and a holographic Fourier transformation optical device which focuses the modulated signal beam onto the hologram recording medium.

21 Claims, 7 Drawing Sheets

(56) References Cited

U.S. PATENT DOCUMENTS

| | | |
|---|---|---|
| 2008/0151340 A1 | 6/2008 | Brotherton-Ratcliffe et al. |
| 2009/0225641 A1 | 9/2009 | Sugita et al. |
| 2010/0085859 A1 | 4/2010 | Takahashi et al. |
| 2011/0249309 A1 | 10/2011 | McPheters et al. |
| 2012/0092980 A1 | 4/2012 | Ostroverkhov |
| 2012/0176880 A1 | 7/2012 | Nakamura |

FOREIGN PATENT DOCUMENTS

| | | |
|---|---|---|
| KR | 1020130018473 A | 2/2013 |
| KR | 1020130022081 A | 3/2013 |
| KR | 1020130022082 A | 3/2013 |

* cited by examiner

APPARATUS FOR RECORDING AND REPRODUCING HOLOGRAM

CROSS-REFERENCE TO RELATED APPLICATION

This application claims priority from Korean Patent Application No. 10-2012-0098479, filed on Sep. 5, 2012, in the Korean Intellectual Property Office, the disclosure of which is incorporated herein in its entirety by reference.

BACKGROUND

1. Field

Apparatuses consistent with exemplary embodiments relate to apparatuses for recording and reproducing holograms, and more particularly, to apparatuses for recording and reproducing holograms having a compact structure.

2. Description of the Related Art

Holography is a technology whereby an interference pattern between a signal beam containing a signal and a reference beam is recorded to reproduce the signal as a stereoscopic image. Holography may be used in various fields such as the recording and reproduction of stereoscopic images, the prevention of forgery and the verification of genuine articles, or the recording and reproduction of digital data. In addition, fine interference patterns may be recorded on a flat photosensitive recording film in units of pixels, so a three-dimensional image may be viewed on a two-dimensional plane. Micro-holographic technology is currently being commercialized.

Micro-holograms may be classified as rear projection micro-holograms or reflective micro-hologram. A rear projection micro-hologram is a stereoscopic image formed by light that has been transmitted through a recording film, and a reflective micro-hologram is a stereoscopic image formed by light that has been reflected off a recording film. In particular, a reflective micro-hologram may be used to record/reproduce full-color or full-parallax images and may represent gradation.

Typically, a micro-hologram may be recorded by dividing a beam emitted from a light source into a signal beam and a reference beam, modulating the signal beam, and irradiating the signal beam and the reference beam on the same location on a photosensitive recording film. The signal beam may be modulated by using a spatial light-modulator according to an interference pattern calculated by a computer based on an image that is to be finally reproduced from the photosensitive recording film.

A small holographic printing apparatus is essential in order to implement a home or office holographic printing apparatus to which such a hologram recording technology may be applied

SUMMARY

One or more exemplary embodiments may provide apparatuses for recording and reproducing holograms having a compact structure capable of implementing a home or office holographic printing apparatus.

Additional exemplary aspects will be set forth in part in the description which follows and, in part, will be apparent from the description, or may be learned by practice of the presented embodiments.

According to an aspect of an exemplary embodiment, a hologram recording and reproducing apparatus includes: a coherent light source; a beam splitter for splitting a beam emitted from the coherent light source into a signal beam and a reference beam; a signal beam forming unit for modulating the signal beam split by the beam splitter and irradiating the modulated signal beam onto a hologram recording medium; and a reference beam forming unit for directing the reference beam split by the beam splitter onto a location on the hologram recording medium which overlaps a location on the hologram recording medium on which the signal beam is incident, wherein the signal beam forming unit includes: a first light guide member for directing the signal beam split by the beam splitter to a spatial light modulator (SLM); the SLM for modulating the signal beam; and a holographic Fourier transformation optical device for focusing the signal beam, modulated by the SLM, onto the hologram recording medium.

The first light guide member may expand the signal beam.

The hologram recording and reproducing apparatus may further include: an illumination hologram device, disposed on a first surface of the first light guide member, for collimating the signal beam incident and directing the signal beam to the SLM.

The beam splitter may be a complex hologram device that is disposed on the first surface of the first light guide member or on a second surface of the first light guide member, opposite the first surface, splits the light beam incident from the coherent light source into the signal beam and the reference beam, and directs the signal beam to be incident on the first light guide member at an angle satisfying a total internal reflection condition of the first light guide member.

The SLM may be a reflective SLM that is disposed on the first surface of the first light guide member or on a second surface of the first light guide member, opposite the first surface, and directs the signal beam modulated by the SLM to travel toward the holographic Fourier transformation optical device via the first light guide member.

The holographic Fourier transformation optical device may be disposed on the first surface of the first light guide member or a second surface of the first light guide member, opposite the first surface.

The SLM and the illumination hologram device may disposed on opposite surfaces of the first light guide member.

The hologram recording and reproducing apparatus may further include: an additional illumination hologram device disposed on an optical path between the first light guide member and the SLM.

The SLM may be a transmissive type SLM, wherein the illumination hologram device directs the signal beam to be incident on the SLM at an angle and directs the signal beam from the SLM to be incident on the holographic Fourier transformation optical device at an angle, and wherein the holographic Fourier transformation optical device includes a non-axial holographic Fourier transformation device.

The SLM may be a transmissive type SLM, wherein the illumination hologram device directs the signal beam to be perpendicularly incident on the SLM and directs the signal beam from the SLM to be perpendicularly incident on the holographic Fourier transformation optical device, and wherein the holographic Fourier transformation optical device includes an axial holographic Fourier transformation device.

The SLM may be a transmissive type SLM, wherein the illumination hologram device directs the signal beam to be perpendicularly incident on the SLM, further includes a prism disposed between the SLM and the holographic Fourier transformation optical device, and directs the signal beam from the SLM to be incident on the holographic Fourier transformation optical device at an angle, and wherein the holographic Fourier transformation optical device includes a non-axial holographic Fourier transformation device.

The first light guide member may include a plate formed of a transparent material.

The reference beam forming unit may include: a second light guide member disposed in parallel to the first light guide member; a hologram device for directing the reference beam incident from the beam splitter to be incident on the second light guide member at an angle satisfying a total internal reflection condition of the second light guide member; and a refractive device for directing the reference beam from the second light guide member to be irradiated onto the hologram recording medium at a location which overlaps with a location on the hologram recording medium on which the signal beam is incident, wherein the hologram device and the refractive device are disposed on the same surface of the second light guide member or on opposite surfaces of the second light guide member.

Each of the first and second light guide members may include a plate formed of a transparent material.

The first and second light guide members may be fixed to each other with a transparent member through which the reference beam passes without internal reflection.

The hologram device may be disposed on a surface of the second light guide member opposite a surface of the second light guiding member to which the transparent member is fixed.

The reference beam forming unit may be disposed to irradiate the reference beam onto the hologram recording medium at a surface opposite to a surface of the hologram recording medium on which the signal beam is incident, this recording a reflective hologram.

The reference beam forming unit may be disposed to irradiate the reference beam onto the hologram recording medium at the same surface as a surface of the hologram recording medium on which the signal beam is incident, thus recording a transmissive hologram.

The hologram recording and reproducing apparatus may further include: a mechanical location control system for controlling a location of the hologram recording medium relative to other elements of the hologram recording and reproducing apparatus.

The hologram recording and reproducing apparatus may further include: a mechanical location control system for controlling a location of the hologram recording medium with respect to other elements of the hologram recording and reproducing apparatus; and an electronic control unit for controlling at least one of the coherent light source, the SLM, and the mechanical location control system.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
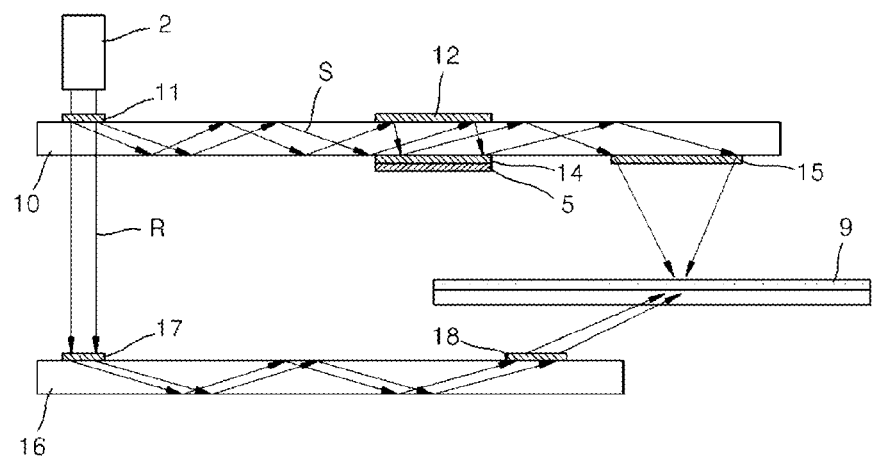
FIG. 1 is a schematic view illustrating an optical configuration of a hologram recording and reproducing apparatus according to an exemplary embodiment.

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Figure 2:
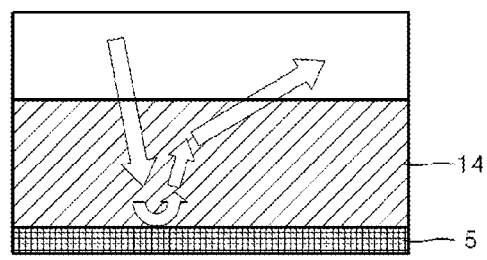
FIG. 2 is a partial magnified cross-sectional view of a spatial light modulator (SLM) illustrated in FIG. 1.
Figure 3:
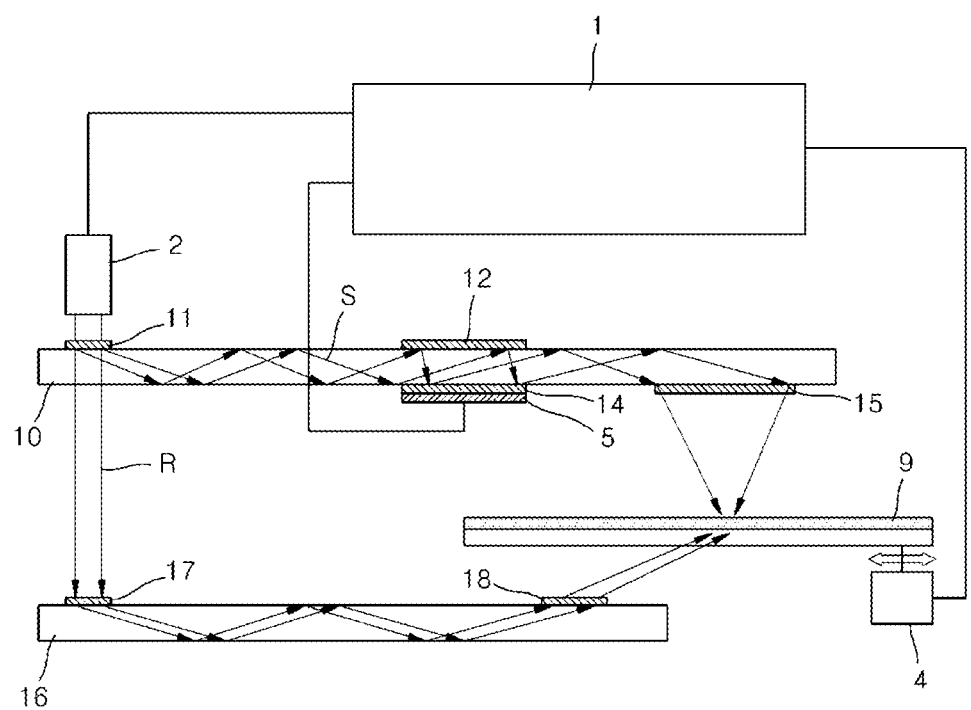
FIG. 3 is a schematic view illustrating a whole configuration of a hologram recording and reproducing apparatus according to an exemplary embodiment.

FIG. 1 is a schematic view illustrating an optical configuration of a hologram recording and reproducing apparatus according to an exemplary embodiment. FIG. 2 is a partial magnified cross-sectional view of a spatial light modulator (SLM) 5 illustrated in FIG. 1. FIG. 3 is a schematic view illustrating a whole configuration of the hologram recording and reproducing apparatus according to an exemplary embodiment.

Referring to FIGS. 1 through 3, a hologram recording and reproducing apparatus includes a coherent light source 2, a beam splitter 11 that splits light emitted from the coherent light source 2 into a signal beam S and a reference beam R, a signal beam forming unit that modulates the signal beam S split by the beam splitter 11 and directs the modulated signal beam to the photosensitive material, i.e. a hologram recording medium 9, and a reference beam forming unit that directs the reference beam R split by the beam splitter 11 onto the same location on the photosensitive material, i.e. the hologram recording medium 9, as the signal beam S, and records coherent patterns of the signal beam S and the reference beam R on the hologram recording medium 9. The signal beam forming unit includes a first light guide member 10 that guides the signal beam S split by the beam splitter 11 and input into the first light guide member 10, the SLM 5 that modulates the signal beam S received from the first light guide member 10, and a holographic Fourier transformation optical device 15 that focuses the signal beam S, modulated by the SLM 5, onto the hologram recording medium 9.

The coherent light source 2 may include a laser light source capable of emitting coherent light, and may perform modulation in time, of a radiation flux. The coherent light source 2 may use, as the laser light emitting source, for example, continuous wave (CW) laser, quasi-CW laser, or pulse wave laser. A laser light source that emits the CW laser or the quasi-CW laser may be relatively inexpensive as compared to a laser light source that emits the pulse wave laser.

The beam splitter 11 may split the laser beam emitted from the coherent light source 2 into the reference beam R and the signal beam S and transmit the signal beam S into the first light guide member 10 of the signal beam forming unit at an angle satisfying a total internal reflection condition such that the signal beam S is transmitted into the first light guide member 10 and expanded. To perform such a complex function, the beam splitter 11 may include a complex hologram device. The beam splitter 11 may be disposed at a predetermined location on one surface of the first light guide member 10. In this regard, the coherent light source 2 may be spaced apart from or disposed adjacent to the beam splitter 11. FIG. 1 and other embodiments that will be described later show a case in which the beam emitted from the coherent light source 2 is perpendicularly incident on the beam splitter 11. When used with a coherent light source 2 that is disposed such that the beam is incident on the beam splitter 11 at a predetermined angle, the beam splitter 11, i.e. the complex hologram device, may be designed so that beam is split, the signal beam S expands, and total internal reflection occurs in the first light guide member 10.

As described above, the signal beam forming unit includes the first light guide member 10, the SLM 5, and the holographic Fourier transformation optical device 15. The signal beam forming unit may further include an illumination hologram device 12. The signal beam S incident on the illumination hologram device 12 is collimated and transmitted to the SLM 5.

The first light guide member 10 allows the signal beam S (that has been split by the beam splitter 11 and is incident on the light guiding member 10 at an angle satisfying the total internal reflection condition) to travel by the total internal reflection. The first light guide member 10 may be formed of a plate of a transparent material. The signal beam S travels in the first light guide member 10 by total internal reflection while continuously expanding. The signal beam S, magnified to a desired size, is incident on the illumination hologram device 12 disposed on the first light guide member 10.

The illumination hologram device 12, which is used to modify the incident signal beam S to form a bright and uniform light field and allow the signal beam S to have a desired diverging angle at a plane of the SLM 5, is disposed at a predetermined location on one surface of the first light guide member 10. When the signal beam S is incident on the illumination hologram device 12, the illumination hologram device 12 reflects the incident signal beam S toward the SLM 5 through the first light guide member 10, and homogenizes the signal beam S to have a uniform brightness by collimating the signal beam S.

The signal beam S that is collimated by the illumination hologram device 12 and is incident on the SLM 5 is modulated according to image information that is recorded to the SLM 5.

The SLM 5 may be a reflective SLM as shown in FIGS. 1 through 3. In this case, the signal beam S modulated by the SLM 5 travels toward the holographic Fourier transformation optical device 15 via the first light guide member 10. FIG. 1 shows an example in which the reflective SLM is disposed on the first light guide member 10 so that the SLM 5 is disposed a surface opposite the illumination hologram device 12.

In the case in which the SLM 5 is a reflective SLM as shown in FIGS. 1 through 3, the holographic Fourier transformation optical device 15 may be disposed on a surface of the first light guide member 10 facing the hologram recording medium 9. In this regard, the holographic Fourier transformation optical device 15 may be separated from the surface of the first light guide member 10.

The holographic Fourier transformation optical device 15 may be disposed to function as a holographic Fourier transformation lens. The holographic Fourier transformation optical device 15 changes a curve of a wavefront of the modulated signal beam S incident from the SLM 5, performs full or partial Fourier transformation on the signal beam S, and focuses the signal beam S to a surface of the hologram recording medium 9. In a case in which the modulated signal beam S is perpendicularly incident on the holographic Fourier transformation optical device 15, the holographic Fourier transformation optical device 15 may be an axial holographic Fourier transformation device. Alternatively, in a case in which the modulated signal beam S is incident on the holographic Fourier transformation optical device 15 at a predetermined angle, the holographic Fourier transformation optical device 15 may be a non-axial holographic Fourier transformation device.

In the case in which the SLM 5 is a reflective SLM as shown in FIGS. 1 through 3, the signal beam S modulated by the SLM 5 is incident on the holographic Fourier transformation optical device 15 at a predetermined angle via the first light guide member 10. Thus, in FIGS. 1 through 3, the holographic Fourier transformation optical device 15 may be a non-axial holographic Fourier transformation device. In this case, the holographic Fourier transformation optical device 15 may change the non-axially incident modulated signal beam S into a focusing beam approximately symmetrical to an axis perpendicular to the holographic Fourier transformation optical device 15 and focus the focusing beam on the hologram recording medium 9.

In addition, in the case in which the SLM 5 includes the reflective SLM, as shown in FIGS. 1 through 3, the signal beam forming unit may further include an additional illumination hologram device 14 disposed on the optical path between the illumination hologram device 12 and the SLM 5. The additional illumination hologram device 14 modifies the uniform brightness light field of the signal beam S to output at a radiation angle necessary for the signal beam S to be incident on the holographic Fourier transformation optical device 15.

A reference beam forming unit performs a function of adjusting an optical delay length of the reference beam R, and forming a coherent pattern by irradiating the reference beam R onto a location of the hologram recording medium 9 on which the signal beam S is irradiated.

The reference beam forming unit may include a second light guide member 16, a hologram device 17, and a refraction device 18. The hologram device 17 and the refraction device 18 may be disposed on the same surface of the second light guide member or may be disposed on opposite surfaces of the second light guide member 16. FIG. 1 shows an example in which the hologram device 17 is a transmissive type hologram device and is disposed on the same surface of the second light guide member 16 as the refraction device 18.

The second light guide member 16 may be disposed in parallel to the first light guide member 10. The second light guide member 16 may be a plate of a transparent material. The hologram device 17 allows the reference beam R incident from the beam splitter 11 to be incident on the second light guide member 16 at an angle satisfying the total internal reflection condition. The refractive device 18 refracts the reference beam R traveling in the second light guide member 16 at a predetermined angle and directs the reference beam R to the hologram recording medium 9 such that the reference beam R is incident on a location of the hologram recording medium that overlaps with an area of the hologram recording medium 9 on which the signal beam S is incident. The refractive device 18 may be a hologram device.

In addition, referring to FIG. 3, the hologram recording and reproducing apparatus may further include a mechanical location control system 4 that controls the relative position of the hologram recording medium 9 with respect to other elements of the apparatus. Also, the hologram recording and reproducing apparatus may further include an electronic control unit 1 that controls at least one of the coherent light source 2, the SLM 5, and the mechanical location control system 4. The electronic control unit 1 may include an interface block for interfacing with external information sources.

The above-described hologram recording and reproducing apparatus may record a coherent pattern since the signal beam S and the reference beam R interfere with each other on the hologram recording medium 9.

In this regard, as shown in FIGS. 1 and 3, when the signal beam S and the reference beam R are irradiated onto opposite surfaces of the hologram recording medium, a hologram recorded on the hologram recording medium 9 is a reflective hologram. That is, when the reference beam forming unit irradiates a surface of the hologram recording medium 9 which is opposite surface to the surface which is irradiated by the signal beam R, as shown in FIGS. 1 and 3, a reflective hologram is recorded.

Figure 4:
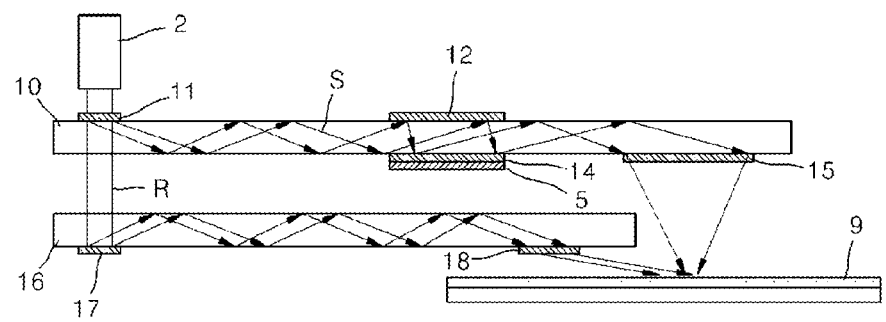
FIG. 4 is a schematic view illustrating an optical configuration of a hologram recording and reproducing apparatus according to another exemplary embodiment.

FIG. 4 is a schematic view illustrating an optical configuration of a hologram recording and reproducing apparatus according to another exemplary embodiment, so as to record a transmissive hologram. The hologram recording and reproducing apparatus of FIG. 4 and a hologram recording and reproducing apparatus according to another exemplary embodiment that will be described later may further include the electronic control unit 1 that controls at least one of the coherent light source 2, the SLM 5, and the mechanical location control system 4 described with reference to FIG. 3.

Referring to FIG. 4, a reference beam forming unit may be disposed to irradiate the reference beam R onto the same surface of the hologram recording medium 9 at as the surface of the hologram recording material which is irradiated by the signal beam S. In this case, a hologram recorded on the hologram recording medium 9 is a transmissive hologram. In a case in which the transmissive hologram is recorded as shown in FIG. 4, the reference beam forming unit may be disposed between the first light guide member 10 and the hologram recording medium 9 in terms of a perpendicular location, and the hologram device 17, that allows the reference beam R incident from the beam splitter 11 to be incident on the second light guide member 16 at an angle satisfying a total internal reflection condition, may be disposed on a bottom surface of the second light guide member 16, and may be formed as a reflective hologram device. The hologram device 17 may be disposed on a surface of the second light guide member 16 facing the first light guide member 10, and may be a transmissive hologram device. In FIG. 4, since a light path from the beam splitter 11 to the hologram device 17 of the reference beam forming unit is shorter than that of FIG. 1, to compensate for such a light length difference, the hologram device 17 or the second light guide member 16 may be modified such that the reference beam R is incident on an inner reflection surface of the second light guide member 16 by satisfying the total internal reflection condition and simultaneously at a further small angle so as to increase the number of times the reference beam R is reflected in the second light guide member 16.

Figure 5:
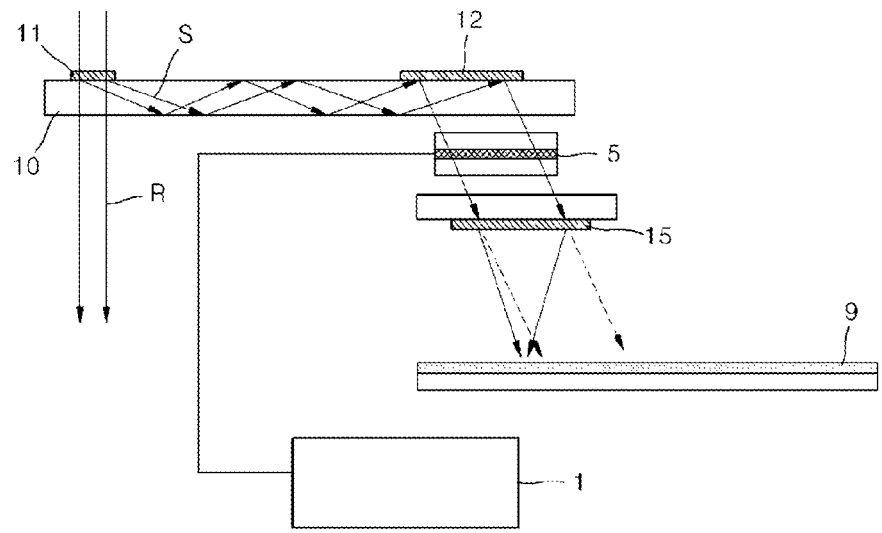
FIGS. 5 through 7 are schematic view illustrating various modifications of a signal beam forming unit of a hologram recording and reproducing apparatus according to an exemplary embodiment in which a transmissive SLM is used as an SLM.
Figure 6:
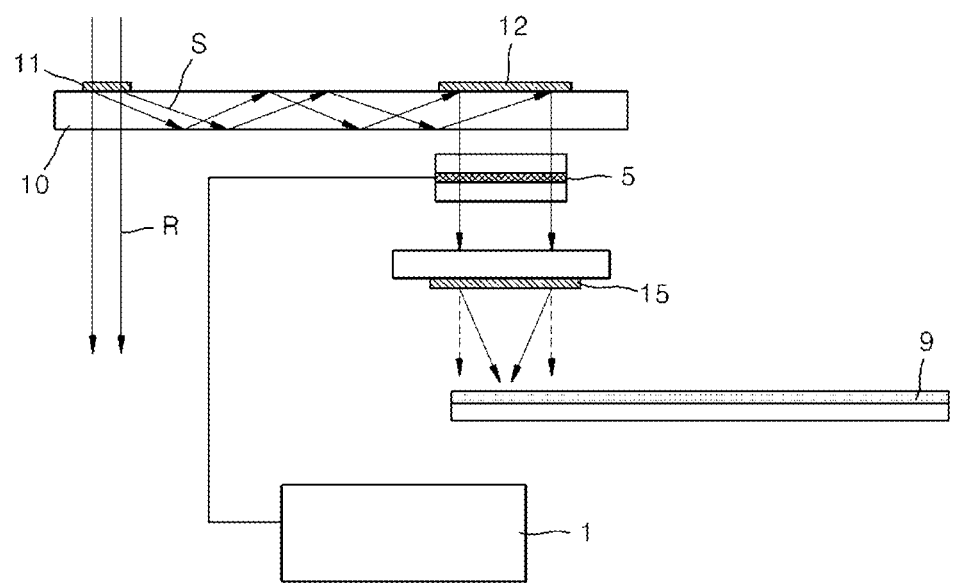
Figure 7:
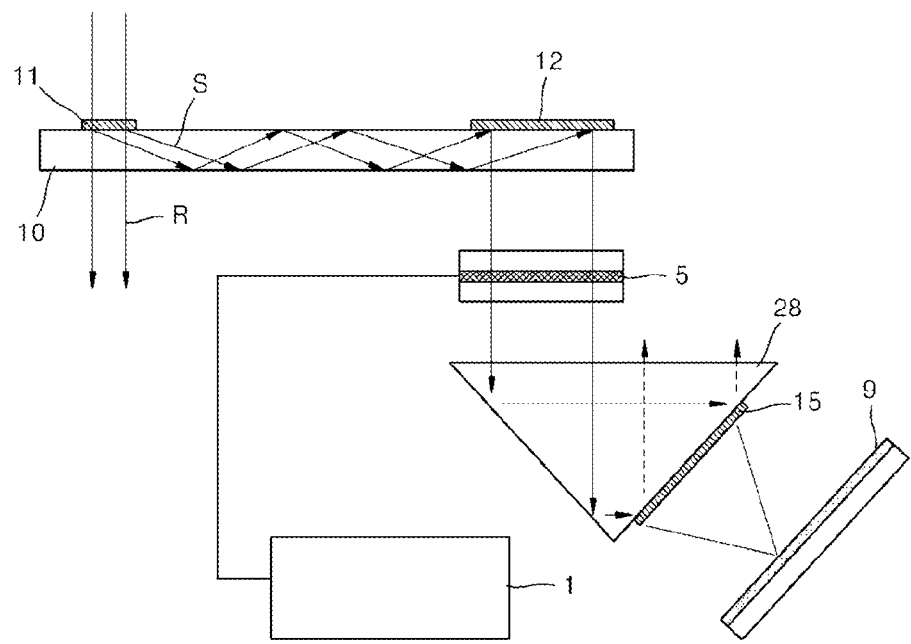

In the hologram recording and reproducing apparatuses according to the embodiments of FIGS. 1 through 4 shown and described above, although the SLM 5 is a reflective SLM, the hologram recording and reproducing apparatuses according to the embodiments may use a transmissive SLM as the SLM 5 as shown in modifications of FIGS. 5 through 7.

FIGS. 5 through 7 are schematic views illustrating various modifications of a signal beam forming unit of a hologram recording and reproducing apparatus according to an exemplary embodiment in which a transmissive SLM is used as the SLM 5. FIGS. 5 through 7 show examples in which the transmissive SLM is used as the SLM 5, and the SLM 5 is spaced apart from the first light guide member 10. The SLM 5 may be disposed on a surface of the first light guide member 10 or adjacent to the first light guide member 10.

Referring to FIG. 5, a signal beam forming unit may include a transmissive SLM as the SLM 5. The illumination hologram device 12 allows the signal beam S to be incident on the SLM 5 at an angle. The modulated signal beam S passes through the SLM 5 to be incident on the holographic Fourier transformation optical device 15 at an angle, and the holographic Fourier transformation optical device 15 is a non-axial holographic Fourier transformation device.

Referring to FIG. 6, a signal beam forming unit may include a transmissive SLM as the SLM 5. The illumination hologram device 12 allows the signal beam S to be perpendicularly incident on the SLM 5, the signal beam S passes through the SLM 5 to be perpendicularly incident on the holographic Fourier transformation optical device 15, and the holographic Fourier transformation optical device 15 is an axial holographic Fourier transformation device.

Referring to FIG. 7, the signal beam forming includes a the transmissive SLM as the SLM 5, the illumination hologram device 12 allows the signal beam S to be perpendicularly incident on the SLM 5, a prism 28 is disposed on the optical path between the SLM 5 and the holographic Fourier transformation optical device 15, the signal beam S passes through the SLM 5 to be incident on the holographic Fourier transformation optical device 15 at an angle, and the holographic Fourier transformation optical device 15 is a non-axial holographic Fourier transformation device.

Figure 8:
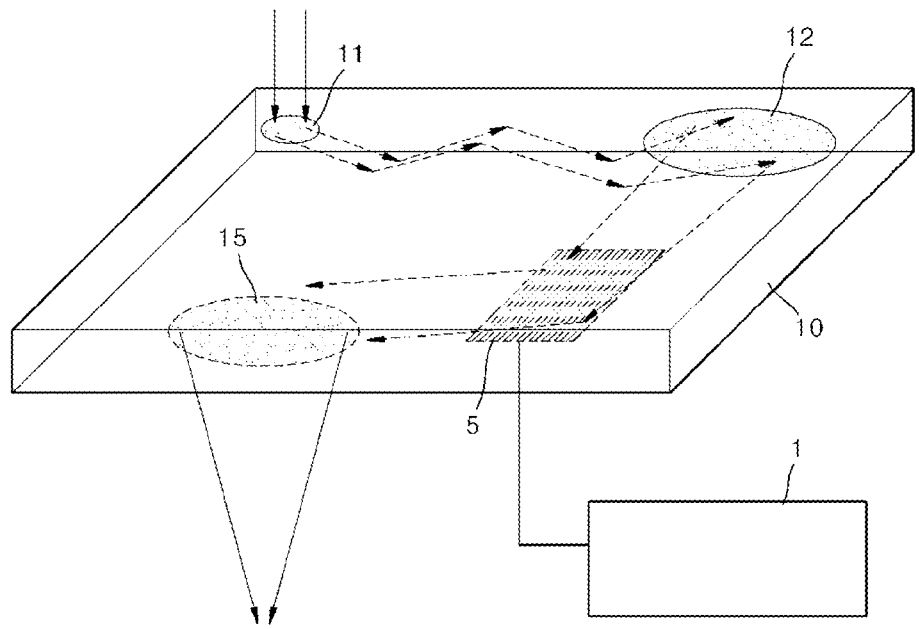
FIG. 8 is a schematic view illustrating another modification of a signal beam forming unit of a hologram recording and reproducing apparatus according to an exemplary embodiment.

FIG. 8 is a schematic view illustrating another modification of a signal beam forming unit of a hologram recording and reproducing apparatus according to an exemplary embodiment.

FIG. 8 illustrates a the signal beam forming unit of a hologram recording and reproducing apparatus according to an exemplary embodiment, in which the signal beam forming unit is may be an integration type unit. That is, the beam splitter 11 and the illumination hologram device 12 may be integrated within a top surface of the first light guide member 10 that is a transparent plate, and the SLM 5 and the holographic Fourier transformation optical device 15 may be integrated within a bottom surface of the first light guide member 10. In this regard, the SLM 5 may be a reflective SLM as shown in FIGS. 1 through 4.

In the case in which the signal beam forming unit as shown in FIGS. 5 through 8 is used, the hologram recording and reproducing apparatus may have a structure as shown in FIG. 1 or 3 or a structure that is appropriately modified the structure as shown in FIG. 1 or 3.

Figure 9:
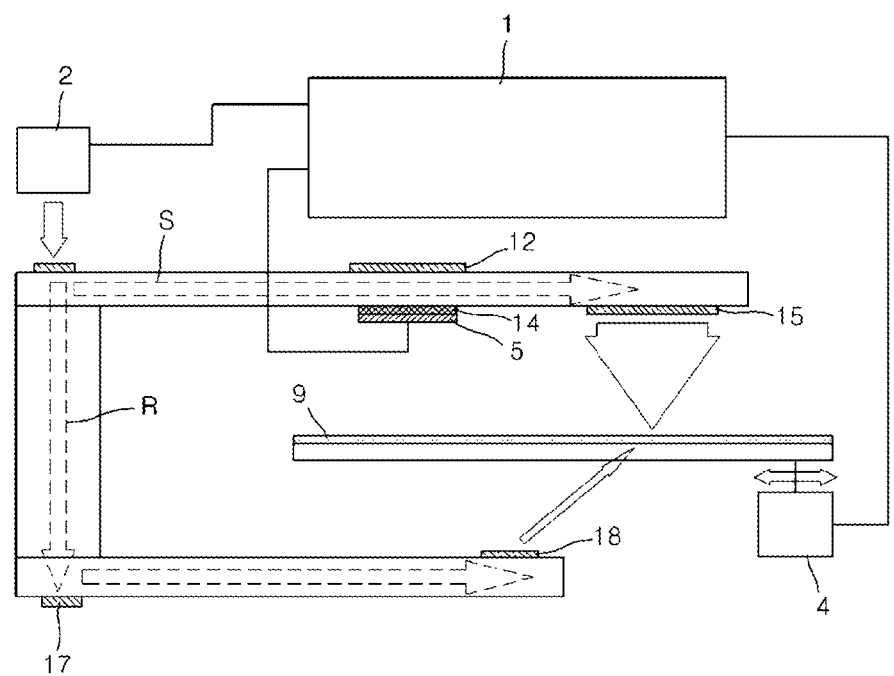
FIG. 9 is a schematic view illustrating a whole configuration of a hologram recording and reproducing apparatus according to another exemplary embodiment.

FIG. 9 is a schematic view illustrating a whole structure of a hologram recording and reproducing apparatus according to another exemplary embodiment.

The hologram recording and reproducing apparatus of FIG. 9 differs from that of FIG. 4 in that the first and second light guide members 10 and 16 are fixed to each other with a transparent member 30 through which the reference light R directly passes without being totally internally reflected. As such, when the transparent member 30 is introduced, for easy arrangement, the hologram device 17 of a reference beam forming unit may be disposed on a surface of the second light guide member 16 opposite a surface on which the second light guide member 16 contacts contacting the transparent member 30. The hologram device 17 may be a reflective hologram device.

In this regard, in the case in which a transmissive hologram is recorded as shown in FIG. 3, the first and second light guide members 10 and 16 may be fixed to each other with the transparent member 30.

As described above, according to the one or more of the exemplary embodiments, the beam splitter 11, the illumination hologram device 12, the holographic Fourier transformation optical device 15, etc. are hologram devices, thereby implementing a compact and small hologram recording and reproducing apparatus, which can be used to implement a small printing apparatus, for example, when the compact and small hologram recording and reproducing apparatus is applied to a printing apparatus, etc.

Accordingly, such a hologram recording and reproducing apparatus having a compact structure may be applied to implement a home or office holographic printing apparatus.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A hologram recording and reproducing apparatus comprising:
   a coherent light source;
   a beam splitter which splits a beam emitted from the coherent light source into a signal beam and a reference beam;
   a signal beam forming unit which modulates the signal beam and irradiating the modulated signal beam onto a hologram recording medium; and
   a reference beam forming unit which directs the reference beam onto a location on the hologram recording medium which overlaps with a location on the hologram recording medium on which the signal beam is incident,
   wherein the signal beam forming unit comprises:
   a first light guide member which directs the signal beam to a spatial light modulator (SLM) by total internal reflection of the signal beam traveling inside the first light guide member;
   the SLM which modulates the signal beam; and
   a holographic Fourier transformation optical device which focuses the modulated signal beam onto the hologram recording medium.

2. The hologram recording and reproducing apparatus of claim 1, wherein the light guide member expands the signal beam split.

3. The hologram recording and reproducing apparatus of claim 1, further comprising: an illumination hologram device, disposed on a first surface of the first light guide member, which collimates the signal beam and directs the signal beam to the SLM.

4. The hologram recording and reproducing apparatus of claim 3, wherein the beam splitter comprises a complex hologram device, disposed on the first surface of the first light guide member, or on a second surface of the light guide member, opposite the first surface, which splits the light beam incident from the coherent light source into the signal beam and the reference beam, and directs the signal beam to be incident on the first light guide member at an angle satisfying a total internal reflection condition of the first light guide member.

5. The hologram recording and reproducing apparatus of claim 3, wherein the SLM comprises a reflective SLM, disposed on the first surface of the first light guide member, or a second surface of the first light guide member, opposite the first surface, which transmits the modulated signal beam toward the holographic Fourier transformation optical device via the first light guide member.

6. The hologram recording and reproducing apparatus of claim 5, wherein the holographic Fourier transformation optical device is disposed on one of the first surface of the first light guide member and the second surface of the first light guide member.

7. The hologram recording and reproducing apparatus of claim 5, wherein the illumination hologram device is disposed on a surface of the first light guide member opposite a surface of the first light guide member on which the SLM is disposed.

8. The hologram recording and reproducing apparatus of claim 5, further comprising: an additional illumination hologram device disposed between the first light guide member and the SLM.

9. The hologram recording and reproducing apparatus of claim 3, wherein the SLM is a transmissive type SLM,
   wherein the illumination hologram device directs the signal beam to be incident on the SLM at an angle and directs the signal beam transmitted from the SLM to be incident on the holographic Fourier transformation optical device at an angle, and
   wherein the holographic Fourier transformation optical device comprises a non-axial holographic Fourier transformation device.

10. The hologram recording and reproducing apparatus of claim 3, wherein the SLM is a transmissive type SLM,
    wherein the illumination hologram device directs the signal beam to be perpendicularly incident on the SLM and directs the signal beam transmitted from the SLM to be perpendicularly incident on the holographic Fourier transformation optical device, and
    wherein the holographic Fourier transformation optical device comprises an axial holographic Fourier transformation device.

11. The hologram recording and reproducing apparatus of claim 3, further comprising a prism disposed on an optical path between the SLM and the holographic Fourier transformation optical device;
    wherein the SLM is a transmissive type SLM;
    wherein the illumination hologram device directs the signal beam to be perpendicularly incident on the SLM, and directs the signal beam transmitted from the SLM to be incident on the holographic Fourier transformation optical device at an angle, and
    wherein the holographic Fourier transformation optical device comprises a non-axial holographic Fourier transformation device.

12. The hologram recording and reproducing apparatus of claim 1, wherein the first light guide member comprises a plate formed of a transparent material.

13. The hologram recording and reproducing apparatus of claim 1, wherein the reference beam forming unit comprises:
    a second light guide member disposed in parallel to the first light guide member;
    a hologram device which directs the reference beam incident from the beam splitter to be incident on the second light guide member at an angle satisfying a total internal reflection condition of the second light guide member; and
    a refractive device which directs the reference beam from the second light guide member to be irradiated onto the hologram recording medium,
    wherein the hologram device is disposed on a first surface of the second light guide member and the refractive device is disposed on one of the first surface of the second light guide member or a second surface of the second light guide member, opposite the first surface of the second light guide member.

14. The hologram recording and reproducing apparatus of claim 13, wherein each of the first light guide member and the second light guide member comprises a plate formed of a transparent material.

15. The hologram recording and reproducing apparatus of claim 14, wherein the first light guide member is fixed to the second light guide member by a transparent member through which the reference beam is transmitted without internal reflection.

16. The hologram recording and reproducing apparatus of claim 15, wherein the transparent member is fixed to the second surface of the second light guide member.

17. The hologram recording and reproducing apparatus of claim 14, wherein the reference beam forming unit directs the reference beam onto a surface of the hologram recording medium which is opposite a surface of the hologram recording medium on which the signal beam is incident, thus forming a reflective hologram.

18. The hologram recording and reproducing apparatus of claim 14, wherein the reference beam forming unit directs the reference beam onto a surface of the hologram recording medium which is the same as a surface of the hologram recording medium on which the signal beam is incident, thus forming a transmissive hologram.

19. The hologram recording and reproducing apparatus of claim 14, further comprising: a mechanical location control system which controls a position of the hologram recording medium with respect to other elements of the hologram recording and reproducing apparatus.

20. The hologram recording and reproducing apparatus of claim 1, further comprising:
    a mechanical location control system which controls a position of the hologram recording medium with respect to other elements of the hologram recording and reproducing apparatus; and
    an electronic control unit which controls at least one of the coherent light source, the SLM, and the mechanical location control system.

21. The hologram recording and reproducing apparatus of claim 1, wherein the first light guide member and the reference beam forming unit are fixed to each other with a transparent member through which the reference light directly passes without being totally internally reflected.

* * * * *